United States Patent
Magee et al.

(10) Patent No.: US 9,060,623 B2
(45) Date of Patent: Jun. 23, 2015

(54) AUTOMATED PATTERN GENERATION PROCESSES

(71) Applicant: Milliken & Company, Spartanburg, SC (US)

(72) Inventors: Ronald Magee, LaGrange, GA (US); Jonathan C. McCay, LaGrange, GA (US); Steven W. Cox, Chesnee, SC (US)

(73) Assignee: MILLIKEN & COMPANY, Spartanburg, SC (US)

( * ) Notice: Subject to any disclaimer, the term of this patent is extended or adjusted under 35 U.S.C. 154(b) by 0 days.

(21) Appl. No.: 14/146,806

(22) Filed: Jan. 3, 2014

(65) Prior Publication Data

US 2014/0120519 A1    May 1, 2014

Related U.S. Application Data

(62) Division of application No. 13/396,873, filed on Feb. 15, 2012, now Pat. No. 8,655,473.

(51) Int. Cl.
| | |
|---|---|
| *G06F 19/00* | (2011.01) |
| *A47F 7/00* | (2006.01) |
| *A47G 27/02* | (2006.01) |
| *G06T 11/00* | (2006.01) |
| *D06P 5/30* | (2006.01) |

(52) U.S. Cl.
CPC .......... *A47F 7/0042* (2013.01); *A47G 27/0275* (2013.01); *G06T 11/001* (2013.01); *D06P 5/30* (2013.01)

(58) Field of Classification Search
CPC ... A47G 27/0243; A47G 27/0275; B44F 5/00

USPC ................................................ 700/130–133
See application file for complete search history.

(56) References Cited

U.S. PATENT DOCUMENTS

| | | | |
|---|---|---|---|
| 4,019,036 A | 4/1977 | Hiramatsu et al. | 235/151.1 |
| 4,033,154 A | 7/1977 | Johnson | 68/205 R |
| 4,386,411 A | 5/1983 | Risk et al. | 364/521 |
| 4,423,676 A | 1/1984 | Neel | 101/211 |
| 4,545,086 A | 10/1985 | Varner | 8/151 |
| 5,070,343 A | 12/1991 | Nakazawa | 346/76 PH |
| 5,195,043 A | 3/1993 | Varner | 364/410 |
| 5,751,829 A | 5/1998 | Ringland et al. | 382/100 |

(Continued)

FOREIGN PATENT DOCUMENTS

| | | |
|---|---|---|
| WO | WO 2004/040537 | 5/2004 |
| WO | WO 2005/026863 | 3/2005 |

OTHER PUBLICATIONS

Patent Cooperation Treaty PCT International Search Report. Date of Mailing, Jan. 24, 2008. International Application No. PCT/US2007/009300. International Filing Date, Apr. 17, 2007.

*Primary Examiner* — Nathan Durham
(74) *Attorney, Agent, or Firm* — Brenda D. Wentz

(57) ABSTRACT

An automated system for generating large numbers of digitally-defined patterns suitable for printing on textiles wherein each pattern is individually different but shares one or more unifying design motifs with all other patterns. In the general case, each pattern is comprised of at least two components in the form of separately configurable pattern layers that are digitally superimposed to form a composite pattern that is unique but visually related to all other unique patterns that use pattern layers taken from the same pattern sources.

8 Claims, 12 Drawing Sheets

(56) References Cited

U.S. PATENT DOCUMENTS

| | | | |
|---|---|---|---|
| 6,305,688 B1 | 10/2001 | Waroway | 273/292 |
| 6,509,979 B2 | 1/2003 | Magee | 358/1.9 |
| 6,704,610 B2 | 3/2004 | West et al. | 700/133 |
| 6,792,329 B2 | 9/2004 | Adams, Jr. et al. | 700/133 |
| 6,793,309 B2 | 9/2004 | McCay et al. | 347/15 |
| 6,854,146 B2 | 2/2005 | Stoyles et al. | 8/150 |
| 6,911,245 B2 | 6/2005 | Beistline et al. | 428/89 |
| 7,070,846 B2 | 7/2006 | Beistline et al. | 428/88 |
| 7,072,733 B2 | 7/2006 | Magee et al. | 700/133 |
| 2003/0139840 A1 | 7/2003 | Magee et al. | 700/133 |
| 2004/0109003 A1 | 6/2004 | Takata | 345/552 |
| 2004/0184857 A1 | 9/2004 | Khaikin | 400/76 |
| 2004/0254670 A1 | 12/2004 | Arkay-Leliever | 700/122 |
| 2005/0106355 A1 | 5/2005 | Kohlman et al. | 428/85 |
| 2006/0240211 A1* | 10/2006 | Daniel et al. | 428/44 |
| 2008/0193698 A1* | 8/2008 | Oakey et al. | 428/44 |

* cited by examiner

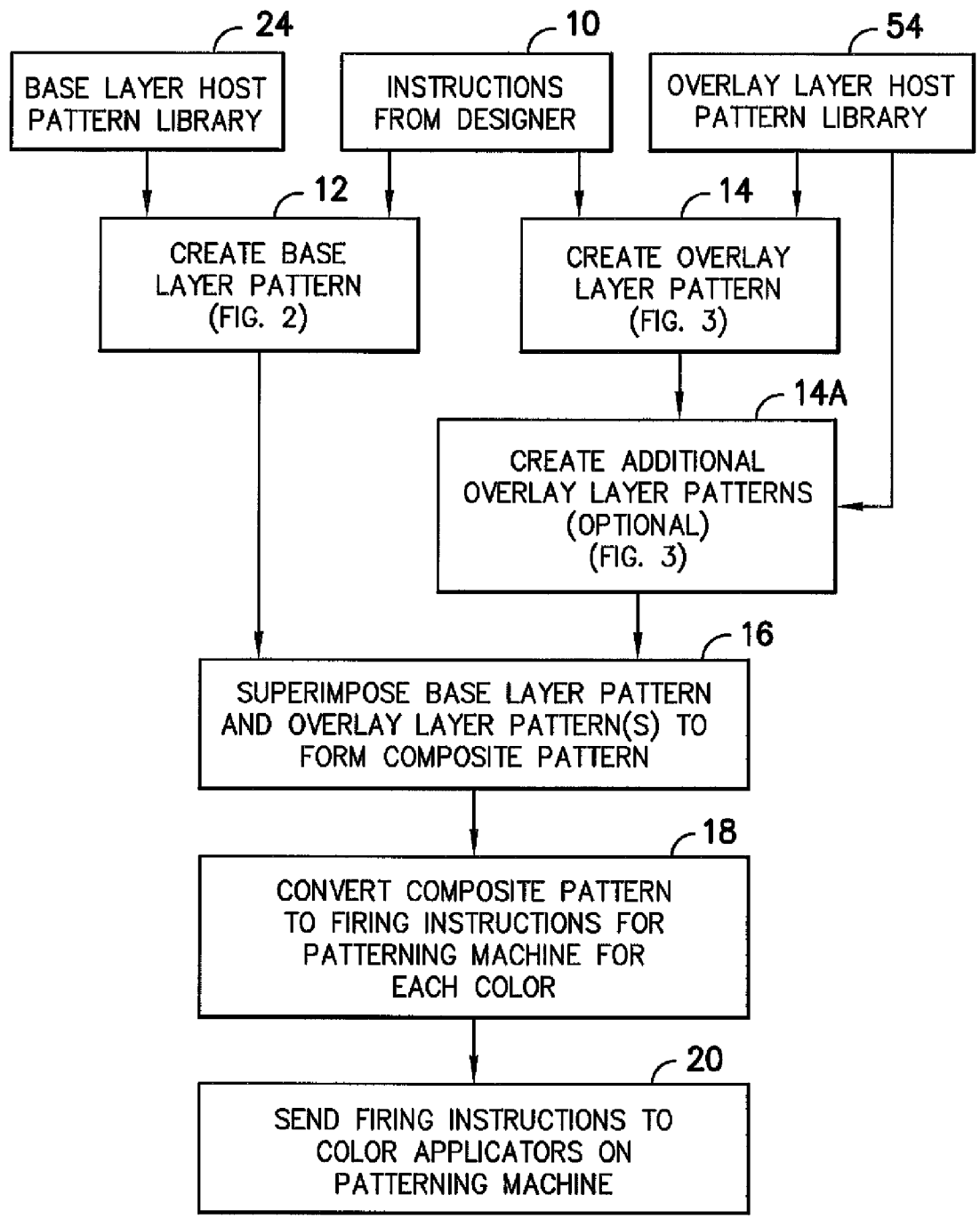
FIG. —1—

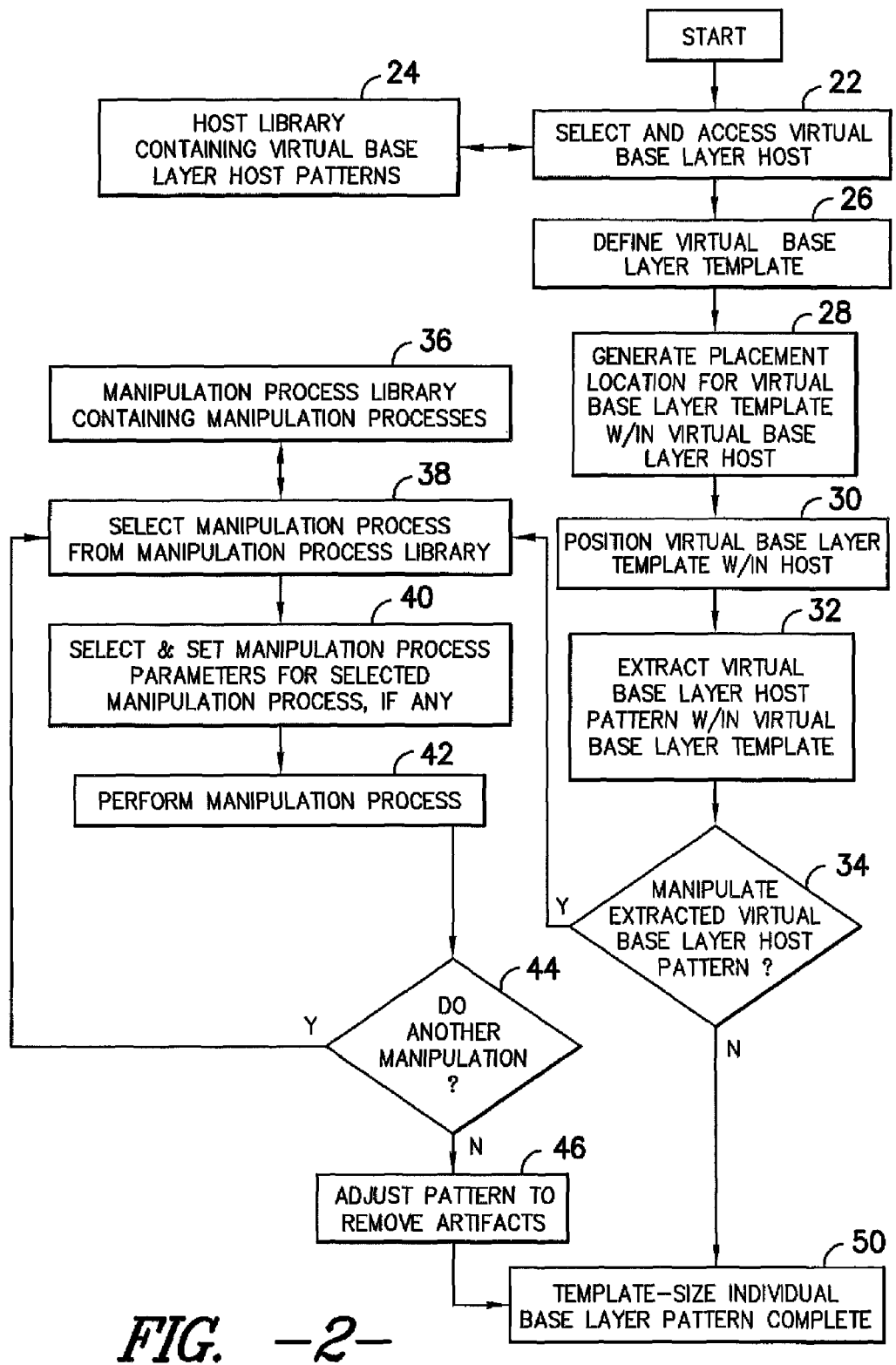
FIG. -2-

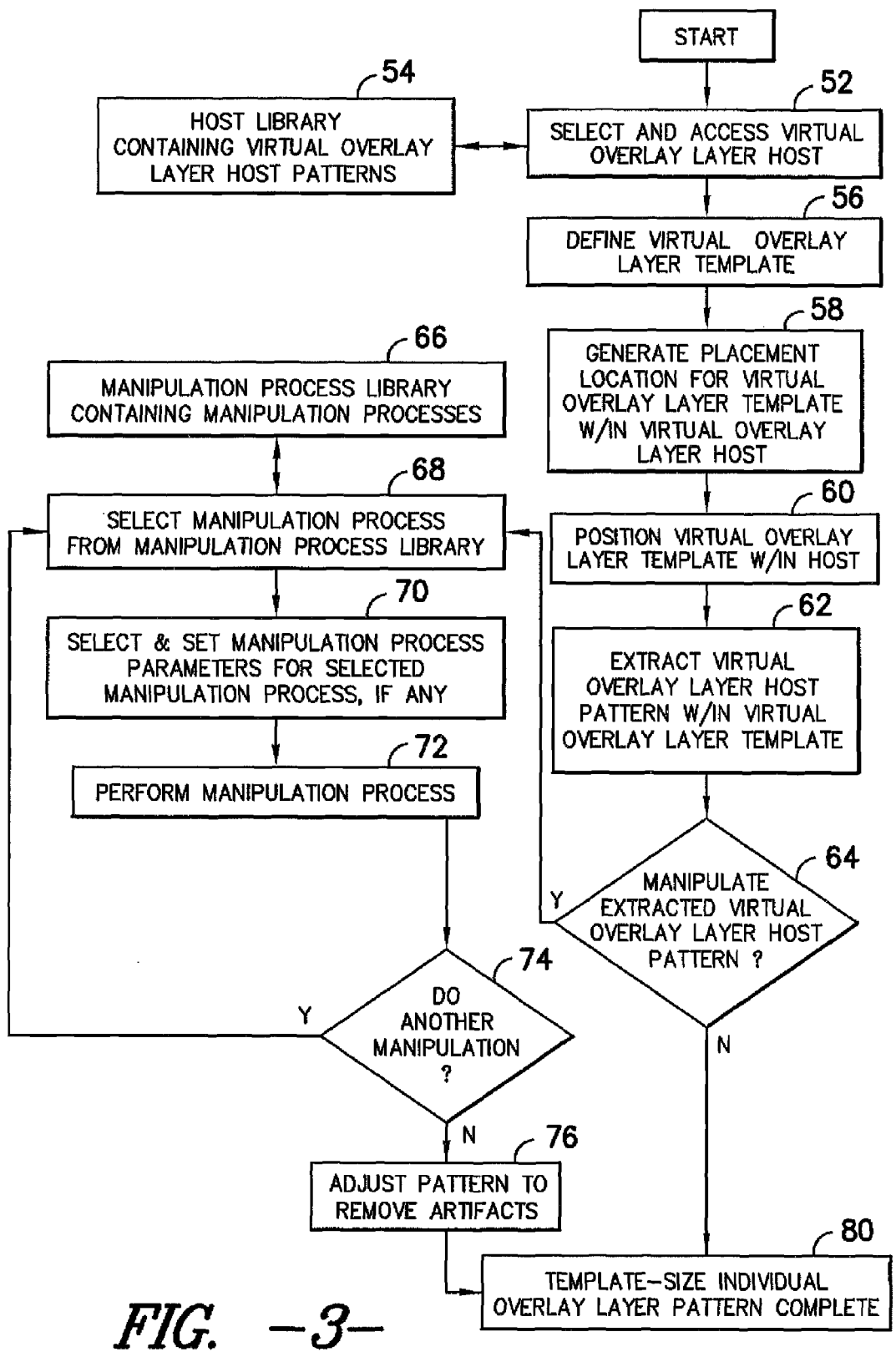
FIG. -3-

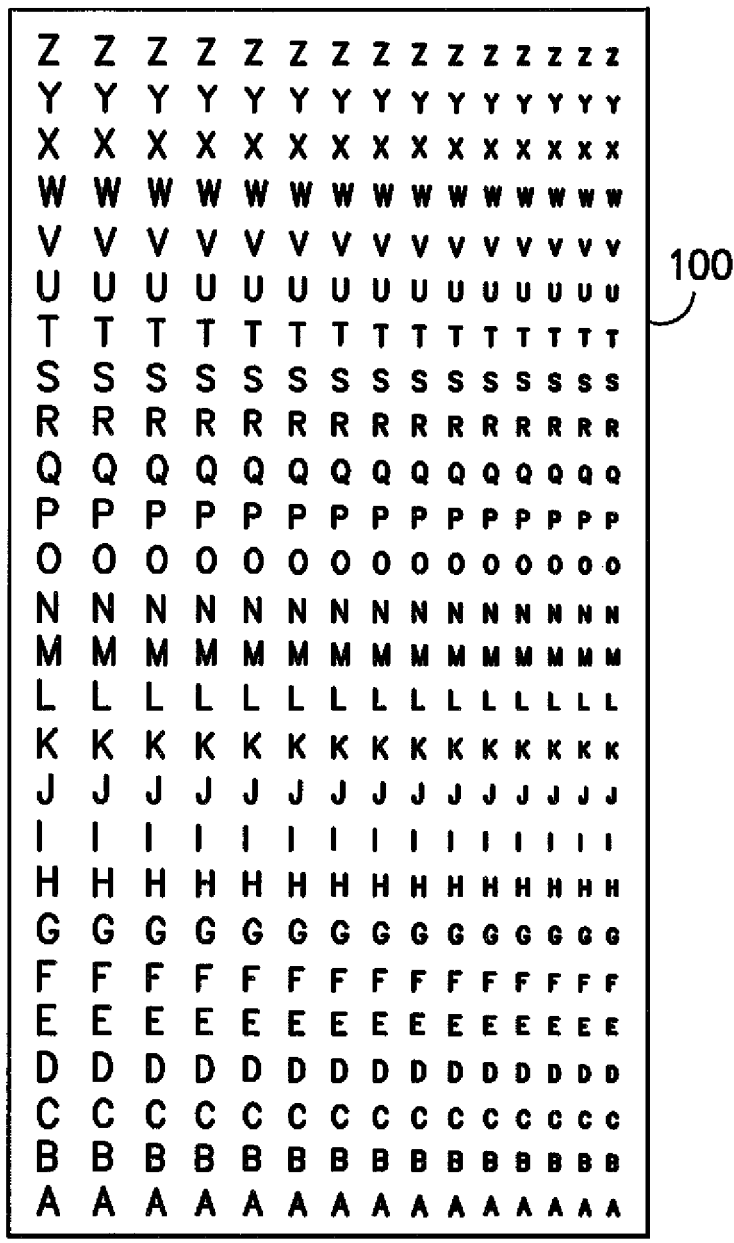
FIG. -4-

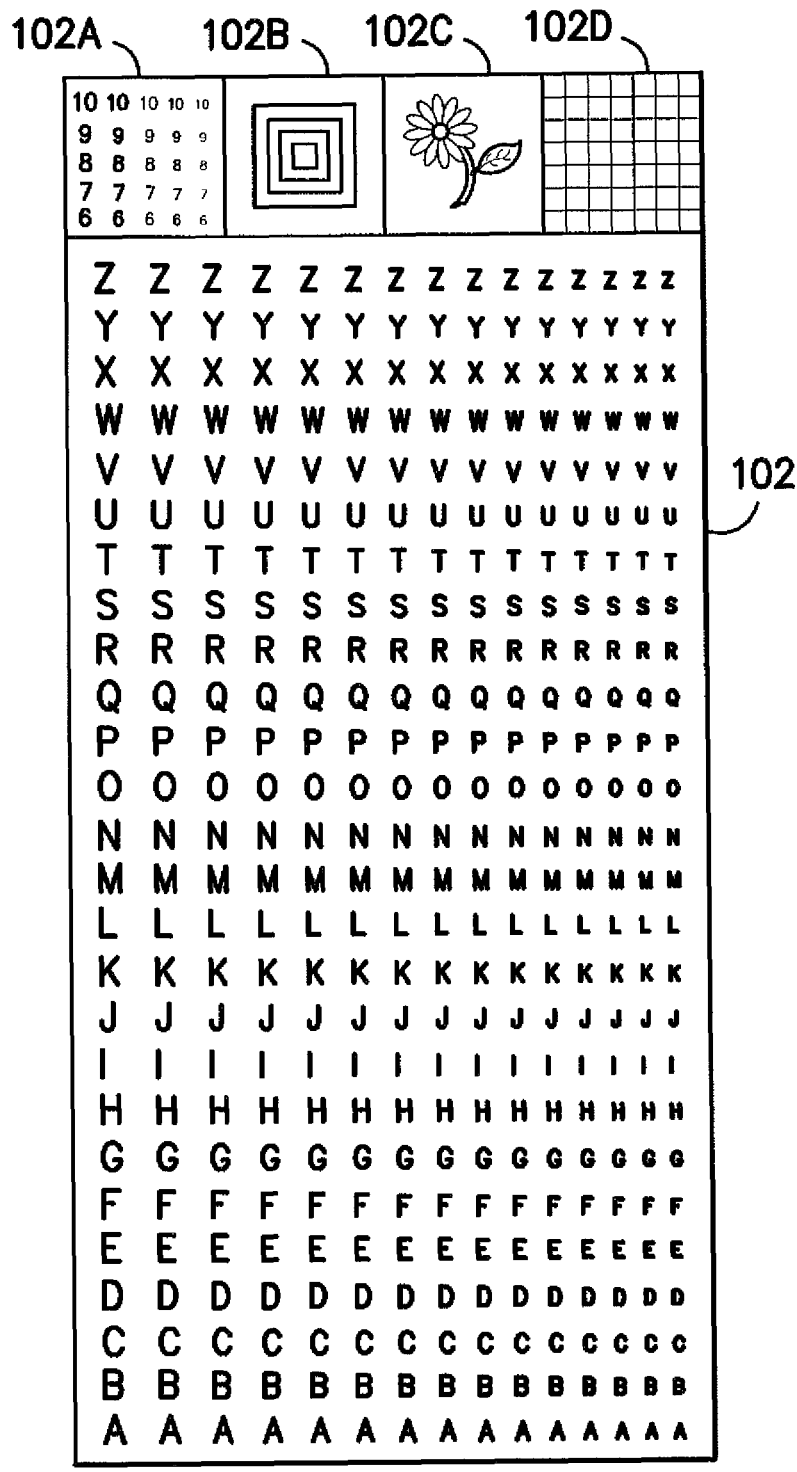
FIG. —4A—

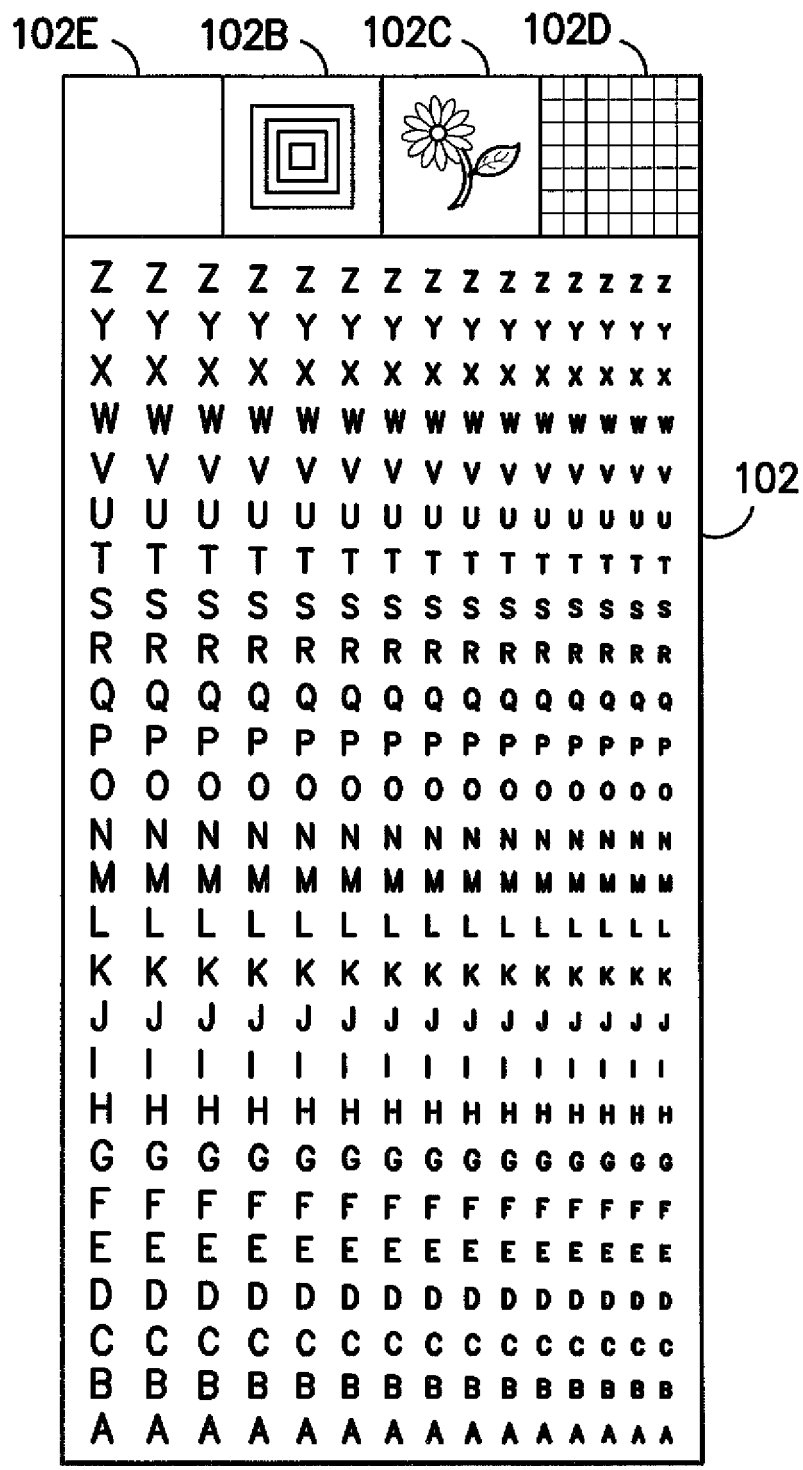
FIG. —4B—

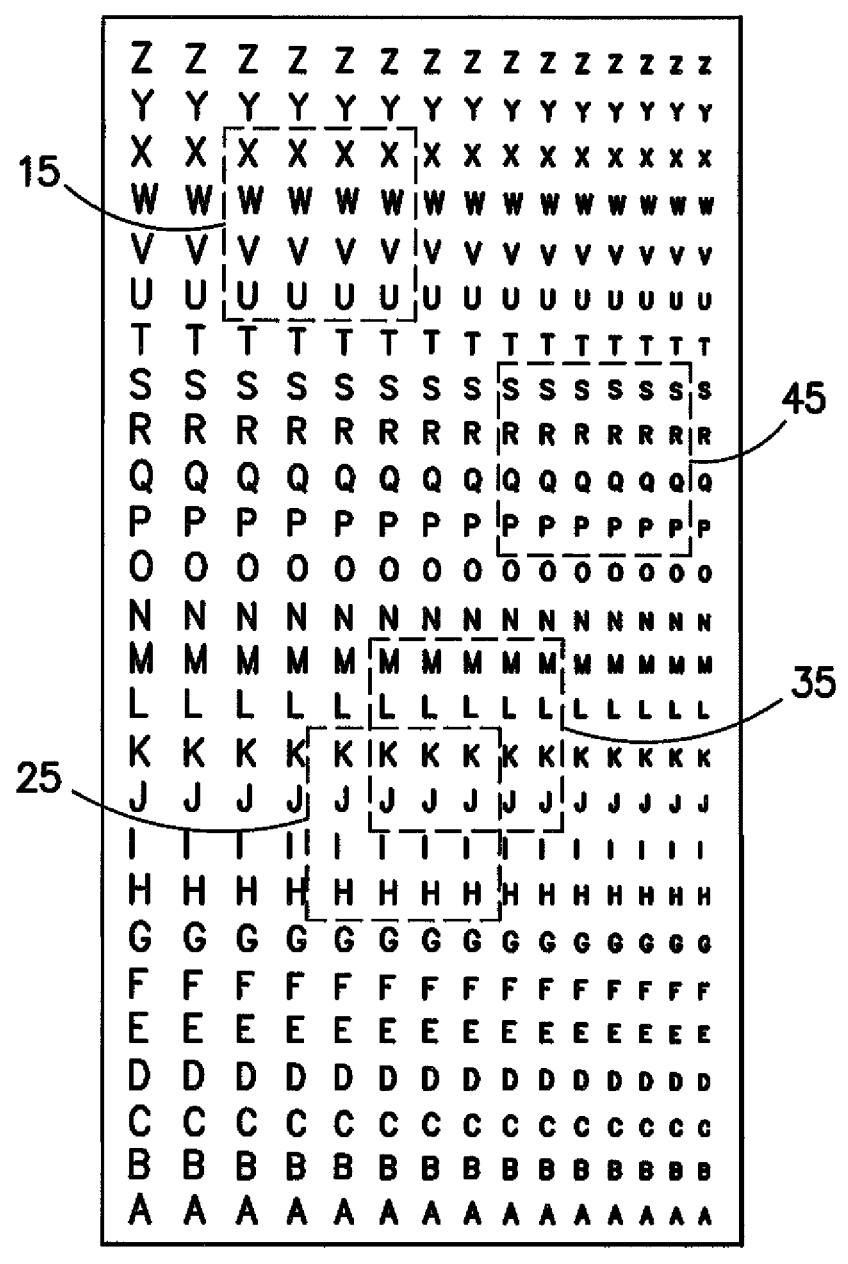

FIG. —5—

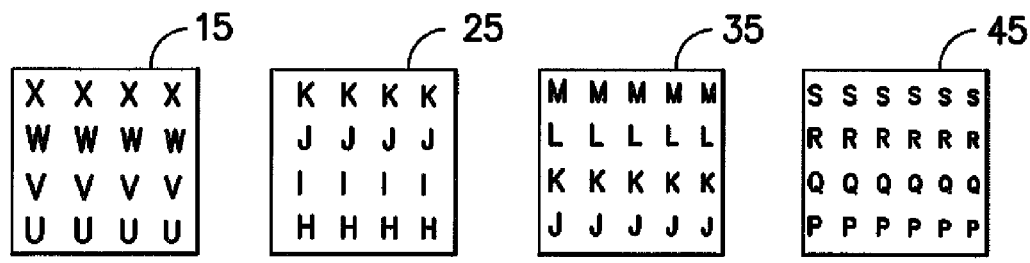
FIG. -6-
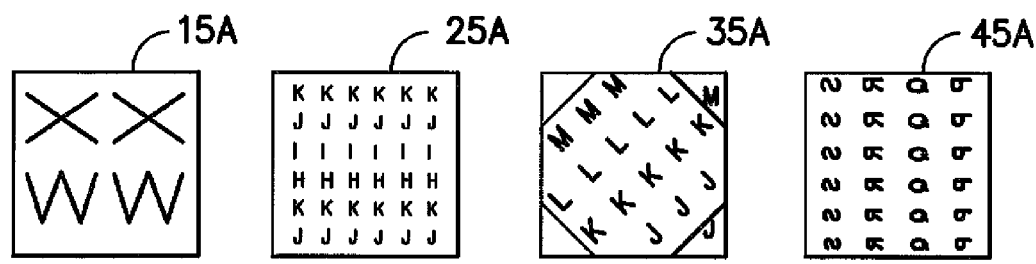
FIG. -6A-

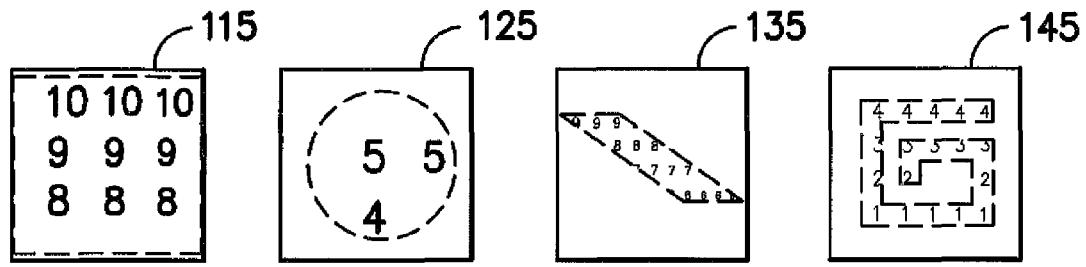
FIG. −9−
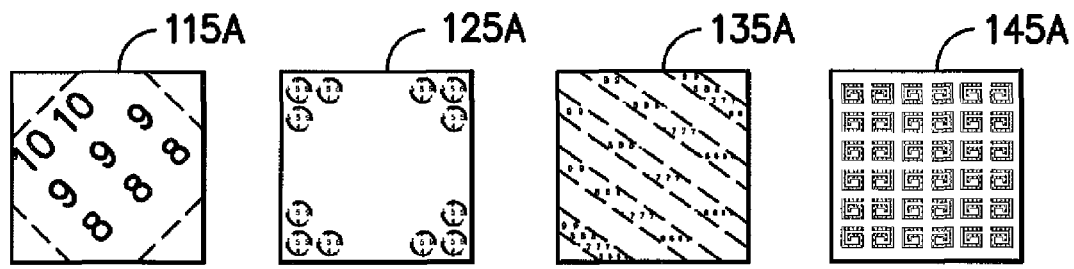
FIG. −9A−
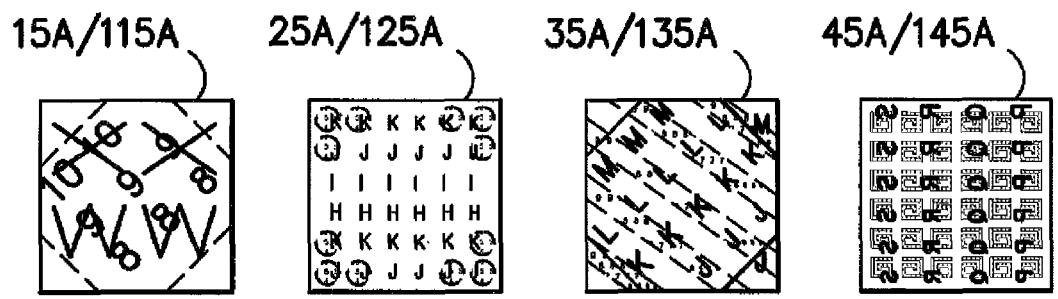
FIG. −10−

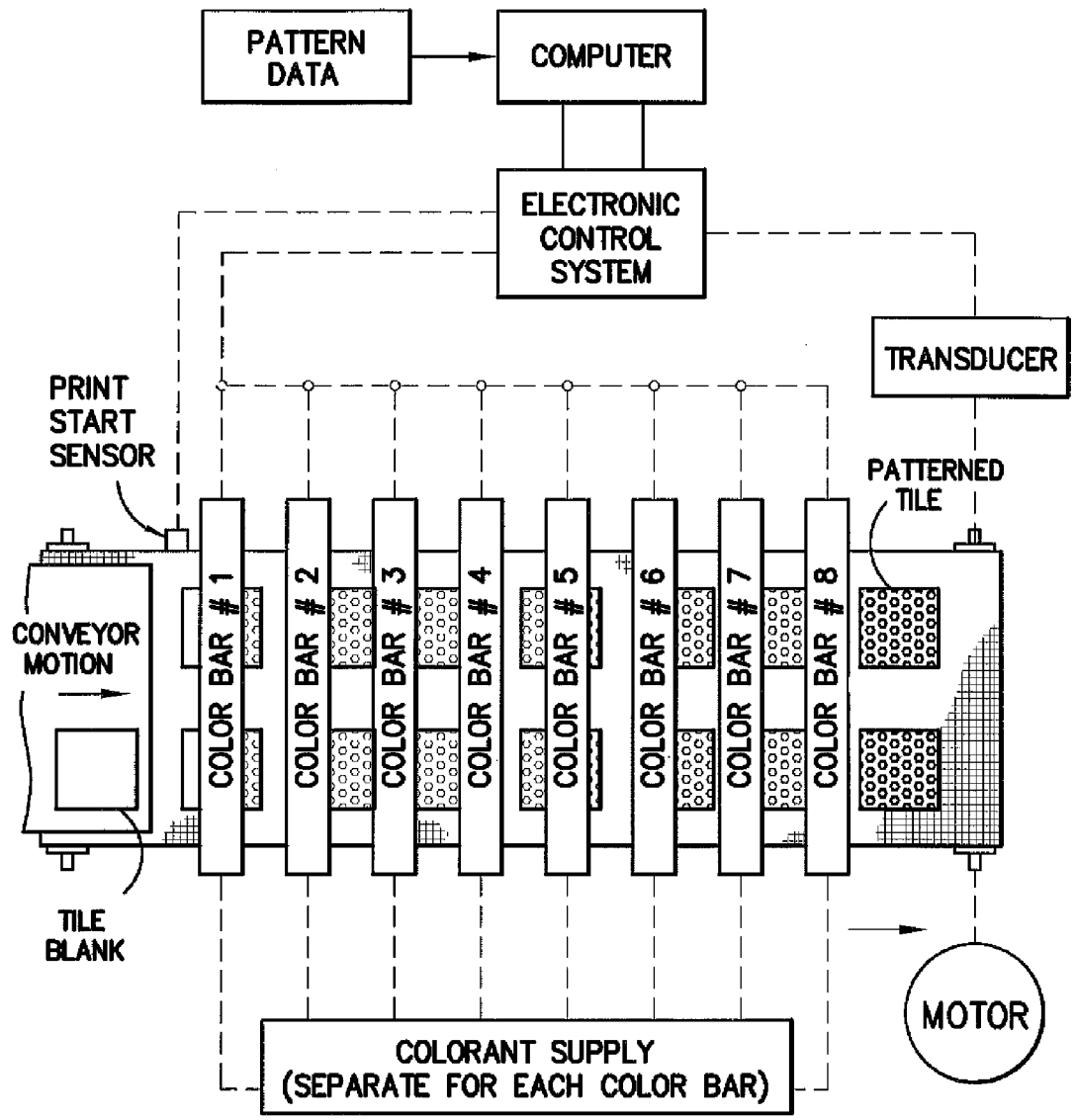
FIG. -13-

AUTOMATED PATTERN GENERATION PROCESSES

CROSS-REFERENCE TO RELATED APPLICATIONS

This application is a divisional of U.S. patent application Ser. No. 13/396,873, entitled "Automated Pattern Generation Processes," which was filed on Feb. 15, 2012, which is a divisional of U.S. Pat. No. 8,145,345, entitled "Automated Pattern Generation Processes," which was granted on Mar. 27, 2012, and which are entirely incorporated by reference herein.

TECHNICAL FIELD

This disclosure relates to an automated system for generating large numbers of digitally-defined patterns suitable for printing on textiles wherein each pattern is individually different but shares one or more unifying design motifs with all other patterns. In the general case, each pattern is comprised of at least two components in the form of separately configurable pattern layers that are digitally superimposed to form a composite pattern that is unique but visually related to all other unique patterns that use pattern layers taken from the same pattern sources. In one embodiment, this patterning system may be used to generate an essentially endless series of patterns for use on individual floor tiles or carpet tiles (which, collectively, shall be referred to as carpet tiles), with no two carpet tiles carrying exactly the same pattern, yet with all carpet tiles carrying at least one common design element or motif that serves to unify the overall pattern when such carpet tiles are installed together. In accordance with the teachings herein, the generation of such patterns can be largely automated and can be carried out as a set of algorithms associated with the patterning machine control system.

BACKGROUND

Floor coverings comprise important interior design elements that are frequently relied upon to unify and enhance a specific interior design concept. Over the last decade, modular carpeting—i.e., the use of carpet tiles—has become a favorite of interior designers, particularly in commercial spaces, due to its potential to mimic the appearance of conventional broadloom carpeting while, at the same time, provide a practical means by which localized portions of the carpeting can be easily replaced in the event of damage, excessive wear, staining, and the like. One specific application of the techniques disclosed herein is to automate the creation of a large number of individual carpet tiles that carry a non-repeating pattern sufficient to generate high visual interest and that disguise, to a large degree, any patterning artifacts that would otherwise be visually objectionable, yet provide one or more common design elements that visually unify a given carpet tile installation.

One of the generally acknowledged key attributes of a successful modular carpet installation, and one that is essential in achieving the look of broadloom carpet, is the inconspicuousness of the seams between contiguous carpet tiles. Where design elements within a single tile are duplicated in adjacent tiles and/or extend into adjacent tiles, and those design elements are not perfectly duplicated within each tile, the region around the seam can become visually obtrusive and can draw attention to any imperfections in the form of mismatched color or misaligned design elements. This condition, which shall be referred to as "seam discontinuity," occurs frequently when there are design elements—for example, a simple band of color—that extend across the boundary and tend to emphasize the transition form one tile to a contiguous tile. Somewhat counter-intuitively, one way to make such transitions as unobtrusive as possible is to apply a pattern to the individual carpet tiles that provides such visual variety across the installation as a whole that the transitions between individual adjacent tiles becomes relatively less important. To the viewer, the non-regular nature of the overall pattern formed by multiple tiles visually overwhelms the discontinuities at the boundaries, with each tile having a unique pattern but one that is aesthetically consistent, in terms of color and individual pattern elements, with all other tiles in the installation.

Another key attribute of a successful modular carpet installation, or any carpet installation, for that matter, is the ability of the selected pattern to provide an unobtrusive complement to the overall interior design. Floor covering patterns are frequently selected on the basis of a relatively small pattern, i.e., one in which a complete pattern repeat may be defined completely within the area of a single carpet tile. Such patterns, however, carry a significant potential disadvantage. In many cases, otherwise well-placed design elements appear to align into rows, resulting in large-scale pattern anomalies when multiple carpet tiles, comprising large areas of installed carpet, are viewed, especially at relatively low sight angles. Such pattern anomalies, sometimes referred to as "design lines," can be sufficiently severe as to become visually obtrusive and overwhelm the intended overall pattern.

Added to such inherent design-based problems is the fact that the patterning process can occasionally cause slight periodic non-uniformities to occur within the pattern, such as the uneven application of dye within a pattern element or background area, resulting in a local streak or band. When viewed as individual tiles, such periodic non-uniformities are relatively unobtrusive, but when a series of such tiles carrying the same non-uniformity are installed over a larger area, such non-uniformities can become aligned, thereby emphasizing these manufacturing artifacts and forming visually obtrusive streaks or bands that extend over many carpet tiles. For purposes herein, these pattern anomalies, design lines, and manufacturing artifacts shall be collectively referred to as "patterning artifacts."

It is believed that both seam discontinuities and patterning artifacts are emphasized by the choice of the size of the pattern repeat and the subconscious expectation of uniformity or symmetry that is generated by seeing a relatively large expanse of carpet tiles, all having the same pattern. Accordingly, in order to minimize or eliminate such discontinuities and artifacts, the use of a non-repeating design that shares common colors and design elements among adjacent tiles, has been found to be effective in eliminating the subconscious expectation of uniformity or symmetry, thereby minimizing the visual impact of patterning artifacts as well as seam discontinuities.

A challenge in implementing this technique is developing a system by which non-repeating patterns can be generated and printed at the time of manufacture. It is possible to achieve a pseudo-random appearance using a relatively small number of different design elements on individual carpet tiles, and then rotating the tiles during installation to produce a more random-appearing overall pattern. However, because this involves turning the tiles to orient them in different directions during installation, the pile orientation of the individual tiles is also turned, which results in a variety of problems, including watermarking or sheen (difference in light reflectivity from tile to tile) and seam problems (dramatic pile lay changes at boundaries).

Accordingly, the technique disclosed herein is believed superior, as these problems are generally avoided. The technique described herein provides a series of carpet tiles that carry a pattern that is non-repeating not only with respect to the selection and placement of design elements, but, optionally, also with respect to the orientation of the pattern on the carpet tile, thereby allowing for an installation that preserves a single direction for pile lay. Additionally, this technique allows for certain geometric operations to be performed on the pattern to enhance the appearance of pattern randomness, if desired. As an additional advantage of the pattern generation system disclosed herein, at least one common design element or motif is incorporated into the design to serve as a visually unifying element across all tiles in the installation. Accordingly, the patterns generated in accordance with the teachings herein and carried by the carpet tiles exhibit a distinct "random" or "pseudo-random" appearance and, individually, are each unique, but these patterns always have at least one design element that is expressed across all generated patterns, thus imparting an underlying uniformity to the carpet tile installation. As an additional benefit, the random or pseudo-random elements incorporated into the design tend to mask any visually obtrusive, large-scale design lines that frequently appear as the unintended artifacts of the design or manufacturing process, as well as any unintended mis-matching of patterns or colors at the boundaries of the individual tiles.

By use of the design system described herein, the designer has at her disposal an automated technique that, with minimal designer input, can generate an endless series of unique patterns that share a common artistic theme or motif and that are suitable for use in patterning carpet tiles or other floor coverings, as well as other textile products. In particular, the system disclosed herein is especially suited for use in patterning carpet tiles or other textiles using the application of interruptible dye streams under the control of electronically-defined patterns and electronically-controlled dye applicators that are actuated in accordance with digitally-defined patterns. In such applications in which electronically-defined patterns are accessed and processed as part of the patterning process, the system disclosed herein effectively re-locates a portion of the design process to the actual patterning step in the manufacturing process, where it can proceed without designer intervention.

DEFINITIONS

To facilitate the discussion that follows, the explanations will assume that the substrates to be patterned are carpet tiles of uniform size, but not necessarily of uniform pile height. It should be understood, however, that the concepts may be applied to patterning other substrates, and particularly other textile substrates, with appropriate modifications with respect to the size and nature of the substrate and the pattern effect to be desired. Additionally, it should be understood that the following terms shall have the meanings indicated below, unless the context clearly dictates otherwise. These definitions will serve as an introduction to some of the concepts explained in more detail further below.

The term "layer" refers to a separately configurable virtual data space which stores a pattern or design that is intended to be superimposed upon (or be superimposed by) other patterns or designs (each of which would constitute a separate layer) to form a composite pattern. The pattern for each layer is capable of being independently selected and independently configured, oriented, or otherwise geometrically manipulated or colored. For example, a first layer could be comprised of a set of spaced vertical parallel lines and a second layer could be comprised of a set of spaced horizontal parallel lines. Inhabiting separate layers within the design software, the spacing of the first and second set of parallel lines could be independently adjusted, as could the color and thickness of the lines, etc. When electronically combined or superimposed, the two layers form a grid. Because the orientation of the lines comprising each layer also could be adjusted as part of a "manipulation" algorithm, the resulting grid could exhibit intersections that form right angles, or that form oblique angles.

As used herein, one layer will be referred to as the "base" layer (which is comprised of the base pattern, as defined below), and all other layers will be referred to as "overlay" layers (comprised of one or more overlay patterns, as defined below), although this nomenclature does not necessarily imply any order in which the layers are placed on the substrate—in fact, as contemplated herein, these terms are merely used to describe the pattern generation process, and not the process or sequence through which the pattern is actually applied to the substrate. Typically, it is believed the designer will choose the base layer to be that layer that most nearly covers the surface of the substrate to be patterned and onto which one or more overlay patterns are applied, but this is not required by the processes described herein.

The term "host" refers to a master pattern, preferably in virtual form and preferably non-repeating in nature, from which small, template-sized pattern subsets or samples may be defined. If applied to a floor covering context, in one embodiment the host could be thought of as a non-repeating pattern on a virtual large substrate (say, for example, a virtual substrate dimensioned to be twenty feet square), onto which may be superimposed a three foot square virtual template at various locations randomly (or non-randomly) positioned within the large virtual substrate. At each position, the template defines a three foot square pattern "sample" of the master host. If the host pattern is non-repeating, and each template position within the host is unique (i.e., the template position is never exactly repeated), then every host pattern sample defined by the template will also be unique. Conversely, if the position of the template within the host is repeated, then the resulting host pattern sample will also have been repeated. Hosts may be used to define base patterns as well as overlay patterns (see below).

The term "template" refers to a closed geometric shape that defines the borders of the pattern sample to be extracted from the host pattern to form either a base pattern or an overlay pattern. The template may be any shape or size, depending upon the desired design effect; it is contemplated (but not required) that separate templates may be defined for use with each pattern layer.

The term "base layer pattern" refers to a pattern layer, selected or sampled from a host pattern (the "base layer host pattern") using a template (the "base layer pattern template"), that, in a preferred embodiment, is unique. Each unique base layer pattern is printed on a single substrate (e.g., a single carpet tile), resulting in a series of printed substrates that are uniquely patterned (although all substrates will share whatever design similarities that exists within the host pattern that was used, after any pattern manipulation is accounted for). As made clear above, an objective of the processes disclosed herein is the automated generation of a series of patterns to be placed on a respective series of carpet tiles, with the resulting carpet tiles exhibiting a random or pseudo-random pattern that is different from tile to tile, but also exhibiting one or more unifying pattern elements (either from the base pattern host or from the use of an overlay layer pattern) that visually integrate the various tiles. To facilitate the discussion below, it will be assumed that the random or pseudo-random component of the composite pattern is assigned to the base layer pattern, and the unifying pattern elements are assigned to one or more overlay layer patterns (but it must also be understood that the roles of these layers could easily be reversed, even to the extent of having a single overlay pattern layer and multiple base pattern layers).

The term "overlay layer pattern" refers to a pattern layer, separate from the base pattern layer, that, in the general case, is selected or sampled from a separate host pattern (the "overlay layer host pattern") using a separate template (the "overlay layer pattern template").

The term "composite pattern" refers to the superposition of a base layer pattern and at least one overlay layer pattern, as performed electronically prior to any actual patterning step.

A primary purpose of the overlay layer pattern is to provide common pattern elements or colors that are shared by all carpet tiles (or at least the suggestion of such elements or colors), thereby providing a unifying pattern motif across multiple carpet tiles that may carry dramatically different base layer patterns and thereby form a visually integrated interior space despite the "random" appearance of the overall pattern. In one embodiment, the overlay pattern host is larger than the overlay pattern template and can, through varying the placement of the template at different locations within the host, generate overlay patterns that are themselves unique. It is also contemplated that, where the overlay pattern template is smaller than the overlay pattern host, the template can be positioned at the same location within the host, thereby generating a repeating pattern that can be placed at different locations within the composite pattern. Accordingly, one could have a composite pattern (i.e., the superposition of a base layer pattern and one or more overlay layer patterns) in which the same overlay pattern element(s) are expressed at different locations within the composite pattern, or in which different overlay pattern element(s) are expressed at the same location within the composite pattern.

In a different, less generalized embodiment, it is contemplated that the overlay layer host pattern will be sized to match, or nearly match, the size of the substrate to be patterned (e.g., a 36-inch square for patterning a 36-inch carpet tile), and the overlay layer pattern template will simply be the same size as the overlay layer host pattern. This means that every overlay layer pattern will be identical—the same pattern element(s) expressed in the same location(s)—for each composite pattern, and therefore every composite pattern will have the same unifying design element(s) in the same location(s), seen against a background (i.e., a base layer pattern) that is different for each composite pattern.

It is contemplated that some patterns may require more than one overlay layer pattern in order to achieve the desired aesthetic effect. In that case, the processes described herein for generating an initial overlay layer pattern may be simply repeated multiple times until the desired visual effect is achieved.

As will be discussed below, multiple base layer patterns and/or multiple overlay layer patterns may be used, with each such pattern optionally being subject to various graphic or geometric manipulations (e.g., enlarging, stretching, mirror imaging, coloring, etc.), each of which may be controlled by deterministic, pseudo-random, or random selections of manipulation parameters. Accordingly, a virtually unlimited number of pattern variations may be generated using the techniques described herein. Unlike techniques that merely automate the process of generating random or pseudo-random patterns, the system described herein provides the designer with the ability to maintain control, through the use of one or more overlay layer patterns, over the degree to which (and manner in which) each patterned substrate (e.g., each carpet tile) shares a visual similarity with other substrates that are intended to be used together. Through use of the teachings herein, the designer may concentrate on development of the respective host patterns and manipulation processes, rather than attempting to develop, on a one-at-a-time basis, individual pattern variations for use on a large number of individual substrates.

This disclosure can be best understood when read in conjunction with the accompanying drawings, as briefly described below.

BRIEF DESCRIPTION OF THE DRAWINGS

FIG. 1 is a flow diagram that presents an overview of the processes described herein in the form of high level process steps needed to generate the composite patterns described herein, including the pattern formation steps described in more detail in FIGS. 2 and 3.

FIG. 2 is a flow diagram describing, in summary fashion, exemplary sub-processes useful in generating a base layer pattern, with optional pattern manipulation, described in more detail below.

FIG. 3 is a flow diagram similar to FIG. 1, except it describes a process for generating an overlay layer pattern, with optional pattern manipulation. The desired overall aesthetic effect may be provided through the use of two or more separate overlay layer patterns.

FIG. 4 schematically depicts a base layer host pattern, stored in digital form and used as part of the process depicted in FIG. 2. A desirable characteristic of the base layer host pattern, which is virtual in nature, is that it is non-repeating along any line of sight within the host. This is schematically depicted in FIG. 4 by having individual letters of the alphabet (representing individual pattern elements within a pattern) appear in steadily decreasing size (left-to-right) in rows across the width of the host pattern, and ascending letters of the alphabet (again representing individual pattern elements) arranged in columns along the length of the host pattern. Because there is no pattern repeat, no recognizable portion of the host pattern is superimposable on any other similarly sized portion of the host.

FIG. 4A schematically depicts a modified virtual base layer host pattern in which, in the interest of computational efficiency and speed, an array of four overlay layer host patterns, from which overlay layer patterns may be extracted, have been positioned along the upper edge. In the embodiment shown, the overlay layer host pattern is sized to conform to the size of the carpet tile for convenience, thereby eliminating the need for any re-sizing unless some special effect is desired. Use of one of these overlay host patterns may serve as a substitute for use of the overlay layer host pattern of FIG. 7.

FIG. 4B is similar to FIG. 4A, except it illustrates the insertion of a "blank" overlay layer host pattern (102E) for use where no overlay layer pattern is desired.

FIG. 5 schematically depicts the placement of a base layer pattern template (see dashed lines) at four arbitrary locations within the base layer host pattern of FIG. 4. The dashed lines define four base layer tile patterns to be extracted from this host. Because there is no pattern repeat contained within the host pattern, every placement of the template at a unique location within the host pattern will yield a unique base layer tile pattern.

FIG. 6 depicts the four base layer patterns extracted from the base layer host of FIG. 5 prior to any optional pattern manipulation (e.g., re-scaling, mirror imaging, lateral or vertical "flipping", rotating the design, etc.) to further expand the range of patterns that can be produced using the processes disclosed herein. These base layer patterns can be used sequentially as is to form a base layer, or, optionally, can be first subjected to one or more pattern manipulation steps.

FIG. 6A depicts the four base layer patterns of FIG. 6 following exemplary pattern manipulation. Host pattern sample 15 has been cropped and stretched horizontally, host pattern 25 has been reduced in size, with pattern lines repeated to fill in the template space, host pattern 35 has been rotated 45 degrees and superimposed upon itself, and host pattern 45 has been mirror-imaged and rotated 90 degrees. As depicted at 15A, 25A, 35A, and 45A, the resulting patterns are shown as they would appear as patterns for use in a base layer.

Figures 7, 8:
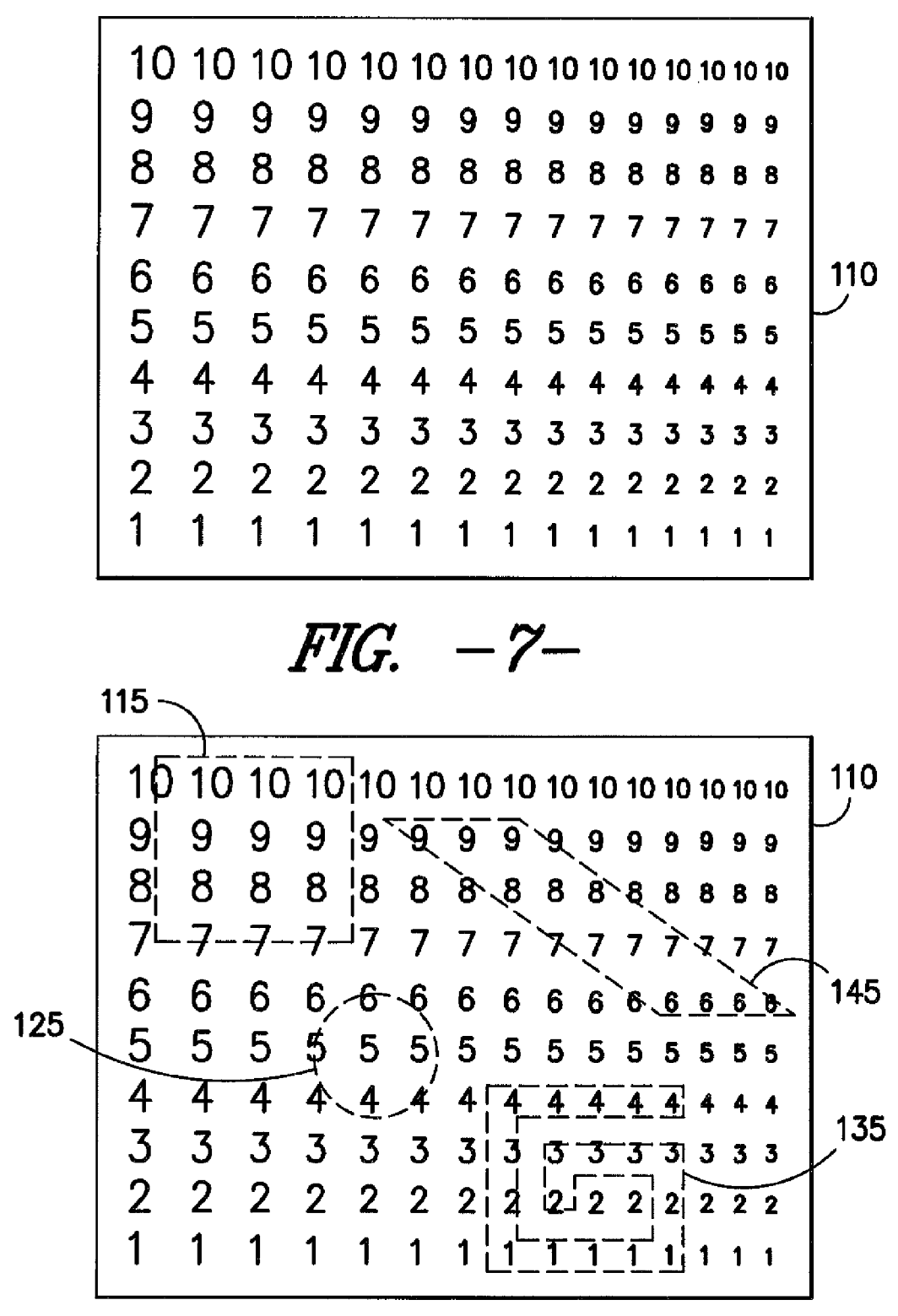

FIG. 7 schematically depicts an overlay layer host pattern stored in digital form and used as part of the process depicted in FIG. 3. As in FIG. 4, this host pattern is also virtual in nature and also is non-repeating along any line of sight within the host. This is schematically depicted in FIG. 7 by having individual numbers one through ten (representing individual pattern elements within a pattern) appear in steadily decreasing size (left-to-right) in rows across the width of the virtual host, with ascending numbers arranged in columns along the length of the virtual host. As in FIG. 4, no recognizable portion of the host is superimposable on any other similarly sized portion of the host.

FIG. 8 schematically depicts the placement of various irregularly shaped overlay layer pattern templates at four arbitrary locations within the overlay layer pattern host of FIG. 7. The dashed lines at 115, 125, 135, and 145 define four overlay layer patterns to be extracted from this host. Each of these patterns may be used as part of the same single overlay layer, or individually in separate overlay layers, or in some other combination.

FIG. 9 depicts the four overlay layer patterns extracted from the overlay layer host of FIG. 8 prior to any pattern manipulation. These overlay patterns can be used as is to form one or more overlay layers, or, optionally, can be first subjected to pattern manipulation.

FIG. 9A depicts the four overlay layer patterns extracted from the overlay layer host of FIG. 8 following exemplary pattern manipulation, wherein the overlay layer host pattern samples have been manipulated and "placed" within individual overlay layers of the same size as the base layer pattern. As shown, host pattern sample 115 has been rotated 45 degrees and placed within overlay layer 115A, host pattern sample 125 has been reduced in size, replicated, and placed in the corners of overlay layer 125A, host pattern sample 135 has been stretched and placed in bands along a diagonal of overlay layer 135A, and host pattern sample 145 has been reduced in size, mirror-imaged, and tiled over the face of overlay layer 145A.

FIG. 10 depicts the result of superimposing, in respective order, the manipulated base layer patterns of FIG. 6A (at 15A, 25A, 35A, and 45A) and the manipulated overlay layers of FIG. 9A (at 115A, 125A, 135A, and 145A), taken in the order shown in the Figures. It is contemplated that the pairing of the base layer patterns with the overlay layer patterns can be cycled through all non-repeating pairings, if additional variation from tile to tile is desired.

Figures 11, 12:
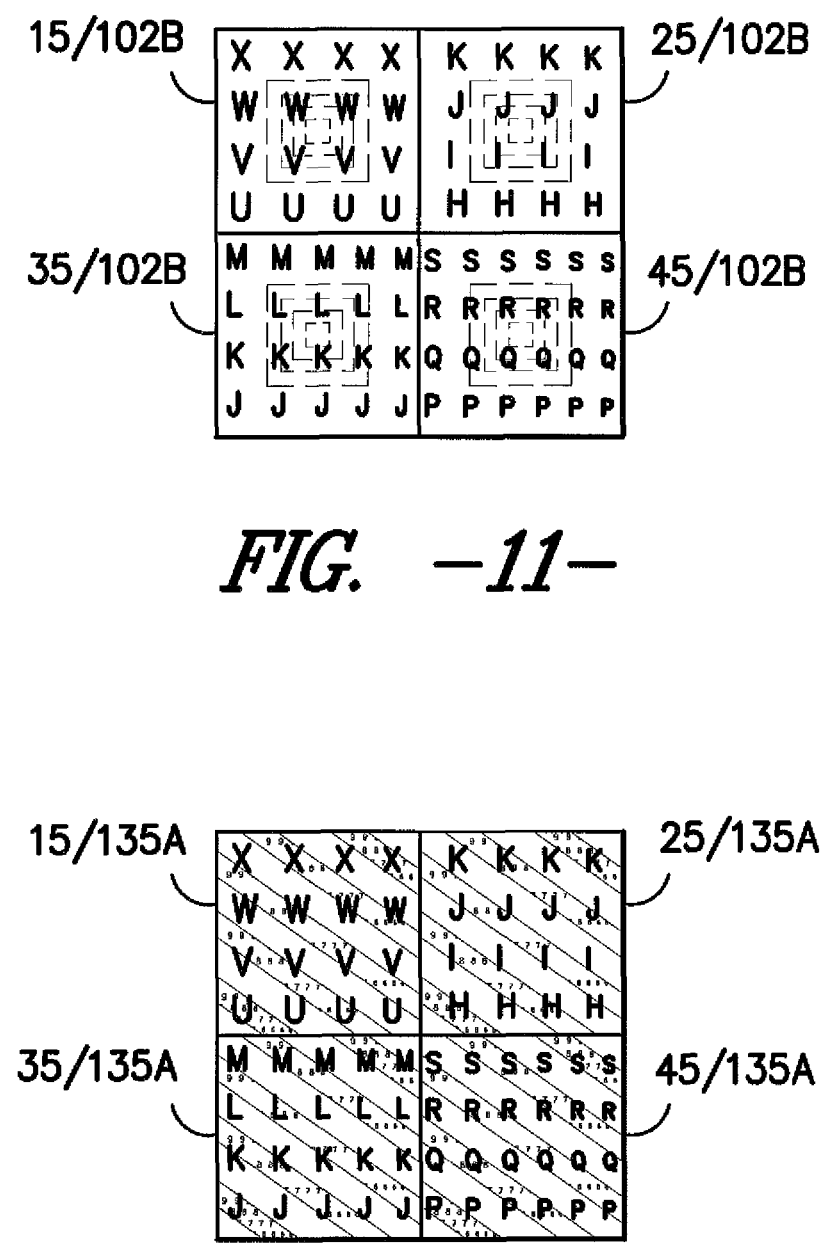

FIG. 11 schematically depicts a 2×2 array of four carpet tiles that have been patterned in accordance with the teachings herein. The nested square motif of overlay layer pattern 102B shown in FIG. 4A has been superimposed on the un-manipulated base layer patterns depicted at 15, 25, 35, and 45 of FIG. 6. Note that the overall pattern formed in each case has random elements (contributed by the base layer pattern) as well as several common or similar motifs (contributed by the overlay layer pattern(s)) that serve to unify visually the overall design.

FIG. 12 schematically depicts another 2×2 array of four carpet tiles that have been patterned in accordance with the teachings herein. In this case, manipulated overlay layer 135A from the overlay host pattern of FIG. 7 is superimposed upon the base layer patterns depicted at 15, 25, 35, and 45 of FIG. 6.

FIG. 13 schematically depicts a patterning machine, suitable for use in connection with the pattern generation system disclosed herein, in which electronically defined patterns can be generated and printed onto the surface of a moving substrate of the kind contemplated herein.

DETAILED DESCRIPTION

Overview

FIG. 1 presents a simplified overview of the interaction between selected sub-processes, some of which are described in greater detail below, that comprise the disclosed design process in which a series of base layer patterns and one or more overlay layer patterns are combined to form a series of composite patterns that are non-repeating, yet carry one or more common design elements. Pre-specified patterns are used to form the base layer host pattern library (Block 24) and, independently, the overlay layer host pattern library (Block 54), from which the base layer patterns and overlay layer pattern(s) are constructed. Instructions from the designer (Block 10) are used as input to the processes for creating the base layer pattern and the overlay layer pattern(s) that are the subject of FIGS. 2 and 3, respectively. These instructions specify, for example, which, if any, manipulations are to be performed on the patterns prior to use as components to form the respective composite patterns. Following the generation of the base layer pattern and overlay layer pattern(s), these respective patterns, having been sized and assigned to appropriate layers, are combined (Block 16) to form a composite pattern of the appropriate scale (e.g., sized to fit the face of a carpet tile) which, in turn, is converted into patterning instructions for the desired patterning machine (Blocks 18 and 20). An example of a suitable conversion process may be found in commonly assigned U.S. patent application Ser. No. 11/047,081 to Cox, et al., the contents of which are hereby incorporated by reference. By varying the selection of the base layer pattern and (perhaps to a lesser extent, in the interest of maintaining continuity from tile to tile) the overlay layer pattern(s), an entire series of non-repeating patterns may be generated that, although unique in appearance, contain one or more common design elements or colors.

Generation of Base Layer Host Pattern and Base Layer Pattern

A schematic representation of a base layer host pattern is shown in FIG. 4. It is contemplated that the virtual base layer host pattern(s) will be pre-generated either manually or by automated means and placed in a virtual host pattern library (Block 24 of FIG. 2) for access by the automated patterning software at the appropriate time.

The concept of the host pattern is straightforward—it is a relatively large virtual pattern within which a smaller virtual template (e.g., conceptually analogous to a "cookie cutter") can be positioned to define a subset or sample of the host pattern. Because the host is comprised of a pattern having a non-repeating nature, then the composition of the pattern defined within the boundaries of the template is entirely a function of the location (and rotational orientation) of the template within the host. So long as the location and orientation of the host is never repeated exactly, the resulting pattern defined within the template will never be duplicated exactly.

For purposes of illustration only, the base layer host pattern of FIG. 4 is shown as being comprised of letters of the alphabet of various sizes, with the individual letters representing non-repeating pattern elements and no individual letters being exactly superimposable or congruent. This arrangement defines a host pattern that is everywhere unique, with no pattern repeats. The size of the base layer host pattern relative to the base layer template may vary, so long as the host is at least somewhat larger than the template. The larger the host pattern relative to the size of the base layer template, the greater the chances that the extracted pattern will have no partial pattern repeat in common with any other pattern extracted from that host. It is preferred, therefore, that the host pattern be at least capable of containing at least two completely unique tile patterns, i.e., ones in which the template is capable of at least two different non-overlapping placements within the host. Ideally, the host will be everywhere unique and sufficiently large that dozens of non-overlapping template placements are possible. This condition will maximize the number of non-identical patterns of the size and shape of a carpet tile that may be produced from a single host. However, it is contemplated that hosts in which the pattern is merely non-repeating over a substantial portion of the host design also may be used, if desired.

In the case of one embodiment particularly adapted for use in patterning modular floor coverings (e.g., carpet tiles), the template preferably will have the same size and shape as the carpet tile, but it is contemplated that the template can be larger or smaller than a carpet tile (as determined by the designer or perhaps by a software algorithm using random numbers, etc.), with appropriate adjustments made for processing the extracted pattern defined within such a template so that the resulting pattern, when placed in a layer, will have the desired scale relative to the size of the carpet tile. For example, if the template is smaller than the carpet tile, then that pattern may be used in connection with a border or similar artistic device to fill the face of the carpet tile. Alternatively, the desired pattern may be electronically enlarged to fit the face of the carpet tile to be patterned, or multiple patterns may be extracted or otherwise generated, either from the original extracted pattern or in combination with one or more other pattern(s) extracted from the host pattern. In the latter case, where multiple patterns are to be used, the various patterns may be electronically "stitched," collaged, or otherwise combined to form a pattern that is aesthetically pleasing for use on the face of the carpet tile.

Assuming that a base layer host pattern has been generated and stored in the base layer host pattern library (Block 24 of FIG. 2), the remainder of FIG. 2 depicts exemplary steps that may be used to generate a base layer pattern for an individual carpet tile in accordance with the teachings herein. Step 22 requires the selection, accessing, and loading of a specific pre-defined virtual base layer host pattern (perhaps from a collection of several such host patterns) from the base layer host library 24, generally performed pursuant to instructions from the designer. In Step 26, the base layer template is defined. For the sake of discussion, a square template 36 inches on a side, to match the shape and dimensions of a commercial carpet tile, will be assumed. It is expected that this step also will be done with designer input, although, as with the generation of the base layer host pattern, it is foreseen that this step could be automated through the use of pattern generation software algorithms and random or pseudo-random number generators.

Step 28 represents a primary opportunity for completely automated activity by the software. Provided some point associated with the template has been designated as the "location" of the template (e.g., a center point or a specified corner), that point can then be assigned anywhere within the host design, thereby specifying a proposed placement location within the host for the (pre-defined) base layer template. The generation of a location for placement of the template is preferably done through the use of software algorithms using random or pseudo-random numbers, but can also be done through other, more deterministic means (e.g., use of a predetermined list of designer-specified location co-ordinates, etc.) Any selected location, however, must be subject to certain constraints that prevent any part of the template, if positioned at the selected location, from falling outside the boundaries of the host. This can be accomplished through appropriate software tests and subroutines that are included in Block 30 and that provide for repositioning and re-testing of the template or the "wrapping" of the template to the opposite edge of the host. Alternatively, the software can perform a predetermined geometric manipulation on that portion of the pattern that is within the host boundary (e.g., fill in the area outside the host boundary with a mirror image of the portion of the pattern closest to the host boundary) to prevent any part of the pattern within the template from being blank.

Once the template location has met the above tests, the virtual template can be positioned within the virtual host (Step 30), and the portion of the host pattern falling within the boundaries of the template can be defined or "extracted," thereby forming the base layer pattern (Step 32). FIG. 5 depicts a base layer host pattern, onto which has been positioned a carpet-tile-sized template at four locations (at dashed lines), yielding the candidate base layer patterns shown at 15, 25, 35, and 45. It should be noted that, although a square template that is intended to be congruent with the printable surface of a carpet tile is shown, the size and shape of the template is somewhat arbitrary.

In FIG. 6, the patterns 15, 25, 35, and 45 represent the extracted base layer patterns from the base layer pattern host 100 shown in FIG. 4, each of which could be used to form a composite pattern on a separate respective carpet tile (i.e., four different patterns for four different carpet tiles). As can be seen, each of these base layer patterns is distinctly different from each other, thereby making less important the option of further pattern manipulation.

At this point, the software checks to determine if any manipulation of the extracted base layer pattern has been requested by the designer (or as the result of a software algorithm using a random or pseudo-random number generator). The basic operations for the manipulation process are shown in FIGS. 36 through 42 of FIG. 2 (for the base layer) and 66 through 72 of FIG. 2 (for an overlay layer), and are similar in both cases. Manipulation processes that are contemplated include, but are not limited to, rotations, re-scalings (i.e., expansions and contractions of all or portions of the extracted pattern), mirror imaging (either along an edge or along some selected axis), or the use of more complex, multistep processes (e.g., generating and superimposing a checkerboard pattern on the extracted pattern wherein the checkerboard itself is comprised of some geometric translation of the extracted pattern). In addition to the foregoing operations, it is contemplated that the desired pattern manipulation might include the formation of a collage of several extracted patterns, in which the random element might be the selection of the extracted patterns to be used, or might be the positioning of the selected extracted patterns, or a combination (i.e., the random placement of randomly-selected extracted patterns).

In carrying out such manipulations, it is foreseen that situations will arise in which certain artifacts of the manipulation process must be addressed. Among such situations, which are offered as examples only, and are not intended to be exhaustive, comprehensive, or limiting in any way, are the following:

1. The template used to extract the sample pattern from the host generates a pattern that, when rotated, no longer is capable of covering the carpet tile to the desired degree. For example, a 36 inch square carpet tile cannot be entirely covered by a 36 inch square sampled pattern if the sampled pattern is to be rotated 45 degrees, thereby placing the 36 inch width of the sampled pattern along the roughly 51 inch diagonal of the 36 inch carpet tile. Similarly, the same sampled pattern, when centered on the face of a 36 carpet tile, will result in a "diamond-on-square" configuration that leaves all four corners of the carpet tile unpatterned. This can be addressed in several ways, including always using a template of sufficient size or shape that the shortest dimension of the sampled pattern equals or exceeds the longest dimension of the carpet tile to which the sampled pattern is to be applied. Alternatively, it is contemplated that the software can, on a trial basis, rotate and superimpose the extracted pattern onto a virtual model of the carpet tile, identify areas of non-coverage (assuming full coverage is desired), and either stretch or replicate portions of the sampled pattern sufficiently to provide the desired coverage.

It should also be noted that, when digital patterns formed by discrete square or rectangular pixels are rotated, the rotation causes the individual pixels to collectively change their orientation, with the border defining each pixel changing from having a horizontal/vertical orientation with respect to the viewer to having an oblique or diagonal orientation with respect to the viewer. This change causes, among other effects, a "stair step" effect for lines directed along diagonals in the pattern.

2. The extracted pattern does not fully cover the surface of the carpet tile to the desired degree (e.g., the template used to extract the pattern has a smaller area or is of a shape that does not meet or overlap all the edges of the carpet tile). This can be addressed by simply re-scaling the sampled pattern or by replicating the pattern (or portions thereof) sufficiently to provide the desired coverage of the carpet tile. Similarly, it is possible that the extracted pattern is too large for the selected carpet tile, in which case the extracted pattern can be re-scaled downward to an appropriate size.

In both Situations 1 and 2, above, the software necessary to perform these operations is well known and can be configured to perform these steps without designer intervention.

If no manipulation has been requested, the generation of the base layer pattern is complete for an individual carpet tile, and the base layer pattern may be stored for use in Block 16 of FIG. 1. If manipulation has been requested, then Blocks 36 through 44 of FIG. 2 are used to select, access and load a manipulation algorithm from a manipulation algorithm library (Blocks 36 and 38), select and set appropriate algorithm parameters (e.g., specifying the amount of pattern of rotation, the degree of re-sizing, etc.) (Block 40), executing the selected algorithm (Block 42), and determining if additional manipulation steps are to be carried out (Block 44). These steps may be done with designer input or may be a decision left to another algorithm (e.g., using random numbers) and may be repeated as often as desired via Block 44. Examples of base layer patterns following such manipulations are shown at 15A, 25A, 35A, and 45A in FIG. 6A. Pattern 15A has been enlarged and flattened, pattern 25A has been reduced in size, with pattern elements added to fill those areas within the base layer pattern that would otherwise be blank; pattern 35A has been rotated, with the addition of non-rotated pattern elements appearing in the corners to fill areas that would otherwise be blank; and pattern 45A has been mirror-imaged and rotated 90 degrees. As shown, all are sized for use in a carpet tile base layer.

When all desired manipulation algorithms have been run, it may be necessary to adjust the manipulated pattern, via appropriate software, to remove patterning artifacts such as those discussed above, as well as excessive "stair-stepping" in diagonal line segments, etc. The adjusted base layer pattern, symbolized at Block 50 of FIG. 2, is then sent to Block 16 of FIG. 1 as a component of the composite pattern to be generated.

Generation of Overlay Layer Host Pattern and Overlay Layer Pattern

The overlay layer host pattern is similar in concept, but, preferably, not in pattern, to the base layer host pattern in that it comprises the overall pattern from which a template may be used to define and extract a pattern—in this case, the template is an overlay layer pattern template and the pattern extracted is an overlay layer pattern. In the general case, the overlay layer host is sufficiently large to provide for a large number of non-identical overlay layer patterns that, when placed on multiple carpet tiles, will impart a visually unifying motif. This may be done through choice of pattern, color, or a combination of pattern and color. As an example of the latter, various different overlay patterns may be used, but if printed in the same color, the overall effect would serve to unify the various patterns.

The steps for the formation of an overlay layer pattern for an individual carpet tile are depicted in FIG. 3, and, in the embodiment shown, closely mirror the steps described above for the formation of the base layer pattern. Several notable differences may arise, however, depending upon the final patterning effect desired. One difference is associated with the fact that several different overlay patterns may be used on a single carpet tile, thereby requiring several different passes through the processes of FIG. 3, whereas, generally speaking, the base pattern for a single carpet tile is generated in a single pass through the process depicted in FIG. 2. A second difference arises from the fact that, generally speaking, the base layer pattern will be configured to accommodate the size and shape of the individual carpet tile, whereas certain overlay patterns may be intentionally much smaller than the carpet tile, with pattern elements that are intended to be positioned at various locations throughout the carpet tile. A third difference arises from the fact that, due to the relative size of the base pattern host compared with the size of the typical base pattern template, there is a reduced need to have the pattern undergo manipulation in order to generate a large number of unique base layer patterns. This is not necessarily true of the patterns and templates used for generating the overlay layer patterns, and, accordingly, the option of using manipulation software to re-configure the overlay pattern extracted form the overlay host is likely to be of greater value.

As set forth in FIG. 3, an overlay layer host pattern is selected (Block 52) from a host library (Block 54), such as the one depicted in FIG. 7. As before, the host pattern has been depicted as an array of non-repeating characters—in this case, numbers—that represent unique pattern elements, thereby retaining the concept that the location and orientation of the template determines the content of the pattern extracted from the host. FIG. 8 depicts four somewhat arbitrary templates, shown at 115, 125, 135, and 145, that are positioned within the overlay layer pattern host of FIG. 7, and which result in the extraction of the overlay layer patterns of FIG. 9. Following the choice of overlay layer host pattern and the selection and positioning of a template within the host, the process pauses to determine if any manipulation of the extracted patterns are to be performed (Block 64). If yes, then the manipulation-related algorithms of Blocks 66 through 74 are called. It should be noted that multiple overlay layers, each with a separate pattern (with or without manipulations), are certainly contemplated as a means to further manage the overall balance between randomness and similarity throughout the carpet tile installation. Accordingly, the steps of FIG. 3 may be repeated as often as necessary to achieve the desired effect.

FIG. 9A shows the respective overlay patterns of FIG. 9 following the use of various manipulation algorithms. Pattern 115A has been rotated to form a "diamond-on-square" orientation when placed on the carpet tile. In FIG. 125A, the circular overlay pattern has been reduced in size, replicated, and re-positioned at the corners of the carpet tile. In FIG. 135A, the oblique parallelogram (and the pattern elements within) has been stretched, replicated, and positioned across the face of the carpet tile. In FIG. 145A, the Greek spiral of FIG. 9 has been reduced in size and formed in mirror image pairs that are replicated across the face of the carpet tile. If it is assumed that the overlay layer contributes primarily to the establishment of a unifying pattern that is superimposed on (or that is superimposed by) a full coverage base layer pattern and does not have to provide full cover when placed on the carpet tile, there is no need to fill in any blank areas formed by the manipulations of these overlay patterns.

In those situations in which computational speed is a high priority (such as those situations in which the disclosed system is used in conjunction with a relatively high speed patterning device such as that depicted in FIG. 13 and the pattern generation steps disclosed herein are done at the patterning machine, in keeping with the teachings herein), the overlay host may be reduced in size to that of a single carpet tile and the corresponding overlay pattern template can be designed to match the size and shape of the overlay host, thereby limiting the possible alternative configurations for the overlay pattern, but greatly increasing the computational efficiency of selecting and configuring the overlay pattern to be used by eliminating the need to call data from a separate overlay layer host library. In FIG. 4A, a virtual base host pattern 102 has been modified to accommodate an assortment of virtual overlay host patterns (102A through 102D) appended along the top edge of the base host pattern.

Once the overlay layer pattern has been selected from among those appended to the base layer host pattern, the process reverts to the tasks of defining and positioning the template, (Blocks 56, 58, and 60 of FIG. 3), extracting the overlay layer pattern (Block 62), and, optionally (but, in many cases, preferably) calling one or more pattern manipulation algorithms (Blocks 66 through 72) prior to removing any pattern artifacts (Block 76). The overlay layer pattern may still be subject to manipulation, but the extracted layer patterns comprising the starting point for such manipulations is limited to those created along the top of base host pattern 102. It should be noted that, in the event that no overlay is desired (i.e., when the carpet tile is to carry only the sampled base layer pattern, in either manipulated or un-manipulated form), no software modifications are necessary if the overlay host pattern is simply specified as an entirely empty pattern, as shown at 102E in FIG. 4B—the combining of the base layer and the overlay layer can proceed as in the general case, but the overlay will have no visual impact on the resulting composite pattern.

As depicted in FIG. 1, following the creation of the desired base layer pattern and one or more overlay layer patterns, the results are electronically superimposed (Block 16) to form a composite pattern which, for purposes of patterning machine processing, is fundamentally identical to a conventionally-derived pattern, and therefore requires no special processing to convert the pattern data to firing instructions for the specific patterning machine to be used. One such machine, a Millitron® textile patterning machine manufactured by Milliken & Company of Spartanburg, S.C., is depicted in FIG. 13. The computer and electronic control system depicted in FIG. 13 are used to perform some of the steps shown in FIG. 1, such as processing the composite pattern data by converting the pattern data into dye applicator actuation commands (Block 18) and sending the appropriate commands, at the appropriate time, to the individual dye applicators (Block 20). Details of this machine can be found in any of several issued U.S. patents or published applications, including U.S. Pat. No. 6,181,816 and U.S. Published Application No. 2003-0139840A1. The contents of these two documents are hereby incorporated by reference. It is believed that, with adaptations that would be apparent to one of ordinary skill, the composite pattern of Block 16 would also be compatible with other textile patterning machines, such as the Chromojet® Carpet Printing Machine available from Zimmer Machinery Corporation of Spartanburg, S.C.

It is contemplated that the carpet tile blanks to be patterned by, for example, a Millitron® metered jet dyeing machine, may be of any suitable construction (e.g., hardback, cushion back, etc.). It is assumed that the face may be constructed of any appropriate textile materials in yarn or pile form that are suitable for dyeing or patterning, and may have a face height or pile height that is uniform or non-uniform (e.g., may be textured, as found in a multi-level loop pile) created by tufting, needling, flocking, bonding, etc., or the use of non-woven substrates.

It should be understood that, while the Figures and discussion above are directed to the patterning of individual carpet tiles, the techniques disclosed above are not necessarily restricted to carpet tiles, but can also be used, with appropriate adaptation as will be readily apparent to those skilled in the art, to pattern broadloom carpeting or other substrates.

We claim:

1. A series of carpet tiles in which each carpet tile carries a composite pattern comprising an underlying pattern having no pattern repeats from tile to tile and an overlay pattern which has at least one pattern element in common with the overlay pattern found on every other carpet tile in said series, wherein said composite pattern is non-superimposable, and wherein the composite pattern is an electronically-defined pattern, each electronically-defined pattern being formed as a virtual composite pattern comprised of at least a first and a second virtual layer, said first virtual layer being associated with a pattern that is unique for each composite pattern and said second layer being associated with a pattern that contains at least one pattern element that is common to all composite patterns.

2. The series of carpet tiles of claim 1 wherein said one pattern element is expressed in the same color for all composite patterns.

3. The series of carpet tiles of claim 1 wherein said pattern associated with said first virtual layer is randomly selected from a virtual host pattern.

4. The series of carpet tiles of claim 3 wherein said pattern associated with said first virtual layer is defined by the boundaries of a virtual template that is positioned on said virtual host pattern.

5. The series of carpet tiles of claim 1 wherein said pattern associated with said second virtual layer is randomly selected from a virtual host pattern.

6. The series of carpet tiles of claim 1 wherein said pattern associated with said second virtual layer is selected from a predetermined library of such patterns.

7. The series of carpet tiles of claim 6 wherein said predetermined library of patterns is appended to said virtual host pattern.

8. The series of carpet tiles of claim 1 wherein at least one of the patterns associated with said first virtual layer is subjected to electronic manipulation prior to the formation of said virtual composite pattern.

* * * * *